United States Patent
Yoon

(10) Patent No.: US 11,023,154 B2
(45) Date of Patent: Jun. 1, 2021

(54) ASYMMETRIC DATA STRIPING FOR UNEVEN NAND DEFECT DISTRIBUTION

(71) Applicant: PetaIO Inc., Santa Clara, CA (US)

(72) Inventor: Jongman Yoon, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 0 days.

(21) Appl. No.: 16/156,929

(22) Filed: Oct. 10, 2018

(65) Prior Publication Data

US 2020/0117382 A1 Apr. 16, 2020

(51) Int. Cl.
*G06F 12/00* (2006.01)
*G06F 3/06* (2006.01)

(52) U.S. Cl.
CPC .......... *G06F 3/0646* (2013.01); *G06F 3/0619* (2013.01); *G06F 3/0679* (2013.01)

(58) Field of Classification Search
CPC ..... G06F 3/0646; G06F 3/0619; G06F 3/0679
USPC .......................... 711/154, 161, 162, 172, 173
See application file for complete search history.

(56) References Cited

U.S. PATENT DOCUMENTS

| | | | | |
|---|---|---|---|---|
| 2002/0032828 | A1* | 3/2002 | Hoskins | G11B 20/1883 711/4 |
| 2014/0095827 | A1* | 4/2014 | Wei | G06F 12/0246 711/203 |
| 2015/0363346 | A1* | 12/2015 | Sabotta | G06F 13/4045 710/300 |
| 2017/0286223 | A1* | 10/2017 | Baptist | G06F 3/067 |

* cited by examiner

*Primary Examiner* — Mardochee Chery
(74) *Attorney, Agent, or Firm* — David R. Stevens; Stevens Law Group

(57) ABSTRACT

A storage device implements striping logic with respect to a plurality of slices, each slice including one or more storage media, such as NAND flash dies. Data operations are distributed among the slice in an unequal manner such that the frequency of selection of a slice decreases with number of defects in the NAND dies of that slice. For example, data operations may be distributed in a round-robin fashion with some slices being skipped periodically. In some embodiments, a skip map may be used that maps host addresses (HLBA) to a particular slice and device address (DLBA) in that slice, the skip map implementing the skipping of slices. The skip map may be smaller than the size of the storage device such that each HLBA is mapped to a zone of the storage device and a slice and offset within that zone are determined according to the skip map.

15 Claims, 5 Drawing Sheets

ASYMMETRIC DATA STRIPING FOR UNEVEN NAND DEFECT DISTRIBUTION

BACKGROUND

Field of the Invention

This invention relates to systems and methods for performing data striping in a NAND flash storage device.

Background of the Invention

In NAND storage devices, the target performance has been getting higher and higher. One of the easiest ways to meet performance requirement is through parallel processing. In this approach, when a NAND storage device receives a read or write commands, it segments the data and distributes it to several slices in a round-robin fashion called data striping. Each slice works completely independently. The performance of the NAND storage device is therefore the cumulatively performance of the number of slices employed.

It would be an advancement in the art to improve the function of a NAND storage device incorporating data striping.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
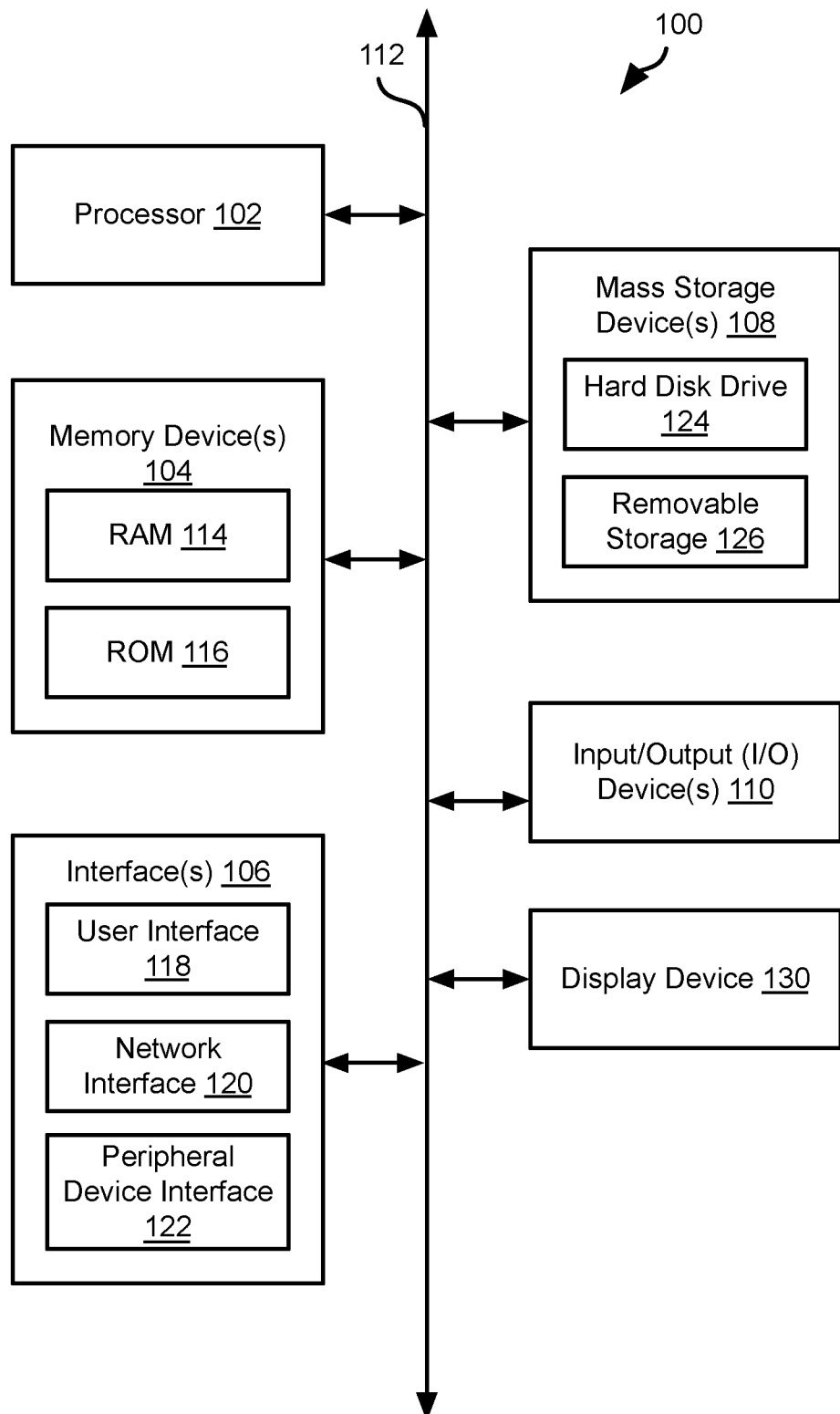
FIG. 1 is a schematic block diagram of a computing system suitable for implementing an approach in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
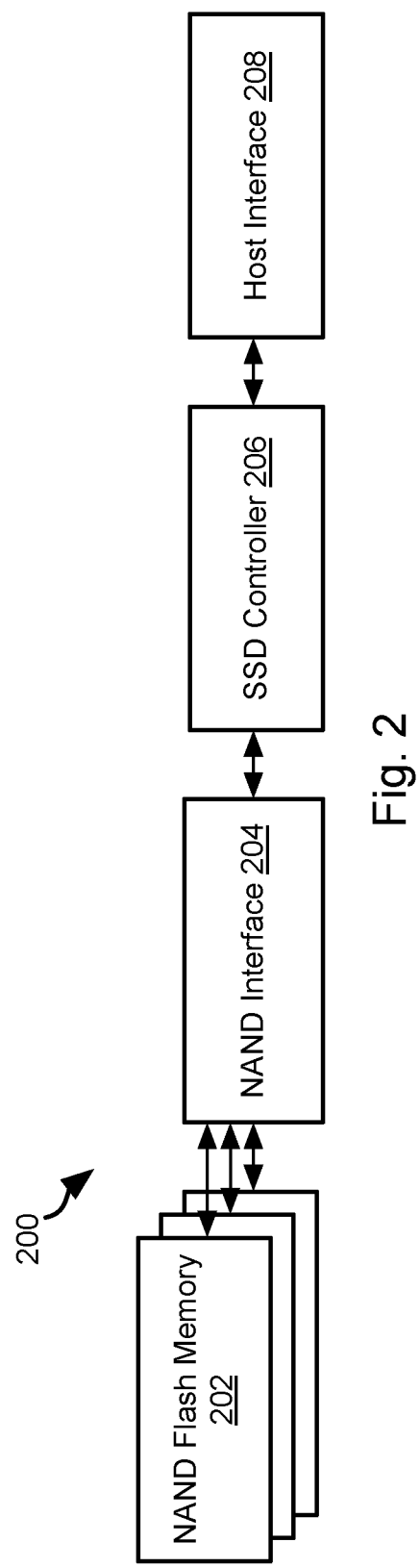
FIG. 2 is a schematic block diagram of components of a storage system that may implement an approach in accordance with an embodiment of the present invention.

Referring to FIG. 2, a typically flash storage system 200 includes a solid state drive (SSD) that may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1.

The methods described below may be performed by the host, e.g. the host interface 208 alone or in combination with the SSD controller 206. The methods described below may be used in a flash storage system 200 or any other type of non-volatile storage device. The methods described herein may be executed by any component in such a storage device or be performed completely or partially by a host processor coupled to the storage device.

In particular, the SSD controller 206, host interface 208, or a processor 102 of a host computing device may be programmed to implement data striping as described below with respect to FIGS. 3 through 6.

In prior approaches, to guarantee parallel operation each slice of a storage device has to exclusively manage its own NAND block resources and deal with its own defects. However, the randomness of defect location causes variation in the available blocks of each slice.

Sometimes in an SSD, such as a NAND storage device, the number of defects is such the number of available blocks is more than the overall target volume size. In others, the number of defects is such the number of available blocks is less than the overall target volume size. In prior approaches to data striping, this would result in failure to meet the target volume size of the slice. For instance, an SSD may need a total 40,000 available blocks to meet a target volume size of SSD device. Slice #1 may have 10,300, slice #2 may have 10,500, slice #3 may have 10,850, and slice #4 may have 9,950. Even though the combination of slices #1 through #4 has 46,000 available blocks, in the normal round-robin striping scheme, this combination of slices cannot compose the required volume size due to slice #4 lacking sufficient available blocks.

In NAND manufacturing, the criteria to screen out high defect NAND are set to avoid the above issues with some additional margin. However, this approach is not a cost-effective because of two issues. One is yield and the other one is wasting of resources:

Yield: The ratio of failure NAND due to high criteria is not trivial in business perspective and other troublesome is how to utilize the screened out NAND that has still a lot of valid blocks is another issue.

Waste of resource: Each slice for parallel processing is mostly likely to have greater than required blocks to meet target volume in statistics. The residue has no place to use and just reserved for the replacement of possible future defects called growing defects.

Figure 3:
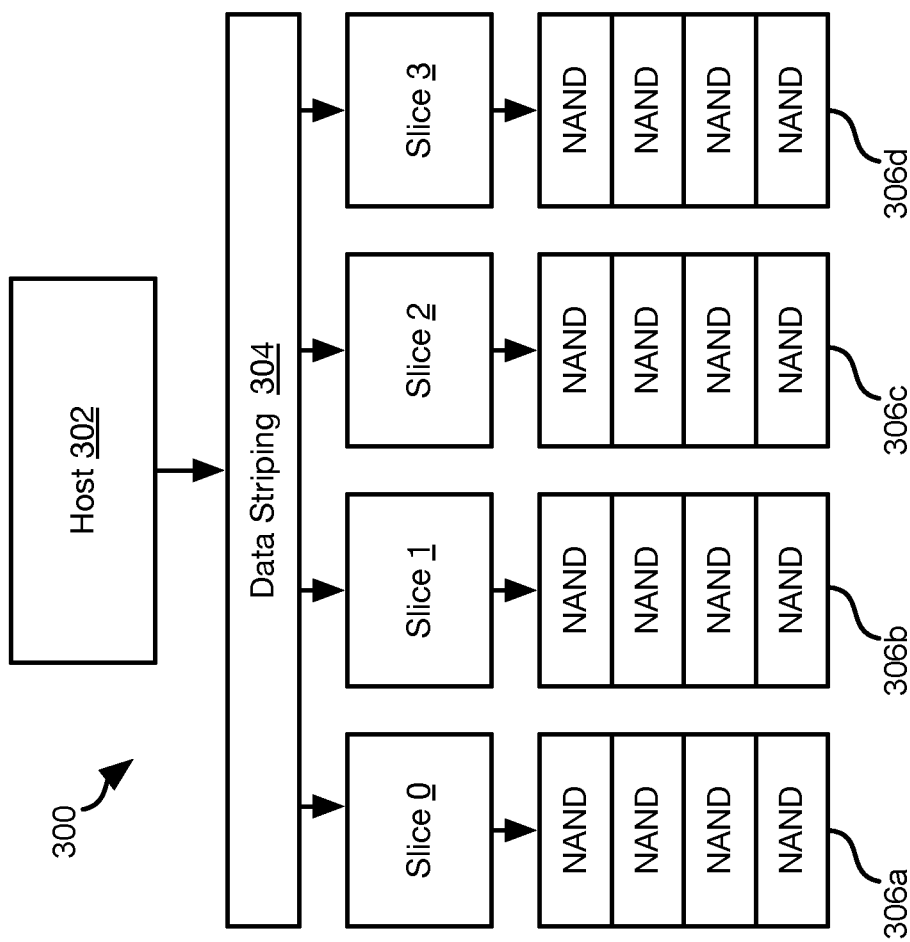
FIG. 3 is a schematic block diagram of components for performing data striping in accordance with the prior art.

FIG. 3 illustrates a conventional approach 300 to data striping, a host 302 transmits operations, such as a read or write operation to a storage device. These operation are then divided among slices, such as by data striping logic 304. For example, in the illustrated embodiment, there are slices 0 through 3 each with its corresponding bank of NAND dies 306a-306d, respectively. Each slice 0-3 handles its own processing of operations assigned to it by data striping logic 304, including In a conventional approach, data operations are assigned to slices 0-3 in a round robin fashion. For example, suppose there are host LBAs indexed 0 through 15. In a conventional approach, LBAs are assigned to slices as follows:

Host LBA 0, 4, 8, and 12 . . . =>SLICE 0
Host LBA 1, 5, 9, 13 . . . =>SLICE 1
Host LBA 2, 6, 10, 14 . . . =>SLICE 2
Host LBA 3, 7, 11, 15 . . . =>SLICE 3

In this example, the slice index (slice_Idx) is readily determined for a host LBA (HLBA) as SLICE_IDX=HLBA % N, where N is the number of slices. The device LBA (DLBA) of the slice slice_Idx where data is to be read or written is determined as Device LBA=Host LBA>>$\log_2(N)$. Accordingly, HLBA0, HLBA4, and HLBA8 are converted to DLBA0, DLBA1, and DLBA2 in this example.

The reverse of this approach may be used to convert a DLBA of a slice to an HLBA using the slice index.

The limitation of the prior approach is that there is no variation between slices. The prior approach requires fixed and identical volume size for all of the slices. However, some NAND dies have more defects and cannot be used to meet the target volume size of a slice. Accordingly, these NAND dies must be discarded or may only be used for a smaller target volume size. On the other hand, NAND dies with a low number of defects may have available blocks in excess of the target volume size that will not be fully utilized. These excess blocks may be reserved for replacement of blocks that may subsequently fail.

Figure 4:
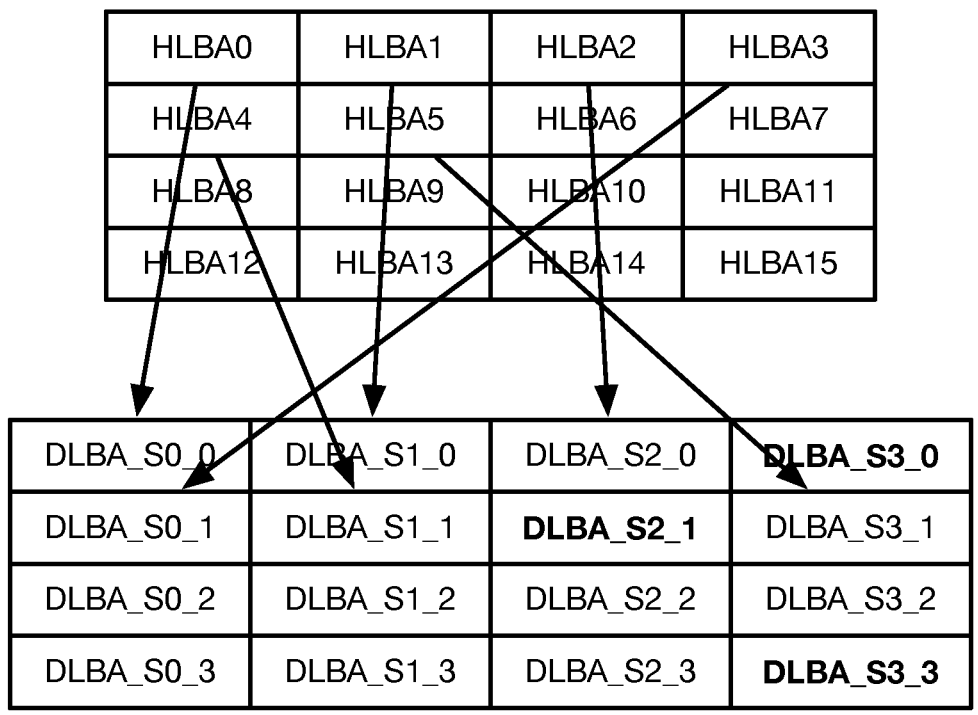
FIG. 4 is a schematic block diagram illustrating data striping in accordance with an embodiment of the present invention.

FIG. 4 illustrates an alternative approach for implementing data striping. In FIG. 4, each column represents a slice. In particular, DLBA_SY_X corresponds to LBA X of slice Y in the notation of FIG. 4. The bolded text indicates where a slice is skipped during the round robin distribution of HLBAs. For example, HLBA0 is assigned to DLBA_S0_0, HLBA1 is assigned to DLBA_S1_0, and HLBA2 is assigned to DLBA_S2_0. However, HLBA3 is not assigned to DLBA_S1_0. Instead, DLBA_S1_0 is skipped and HLBA3 is assigned to slice 0: DLBA_S0_1. The other HLBAs are assigned in a round robin fashion with each DLBA that is written in bold font in FIG. 4 being skipped.

In a conventional SSD, a volume size will be a particular value, e.g., 512 GB, which will be divided equally into slices of the SSD, e.g. 128 GB each for four slices. Suppose the maximum allowed number of defects on each slice is 3% of the physical blocks of the NAND dies making up each slice. In order to make up the volume size, many blocks of the NAND dies in a slice will be excluded from the volume size calculation not only to account for the possible 3% of defects but an additionally number of blocks are designated for other purposes. For example, 15% may be designated for over provisioning (OP), 1% may be reserved for growing defects after manufacturing. So totally ~20% of the blocks in the NAND dies of a slice are excluded from the volume size. In a conventional approach, the total volume size 512 GB would be equal to 80% of the blocks of the NAND dies of the SSD. In a conventional system, this ratio is applied to all slices without exception.

Figure 5:
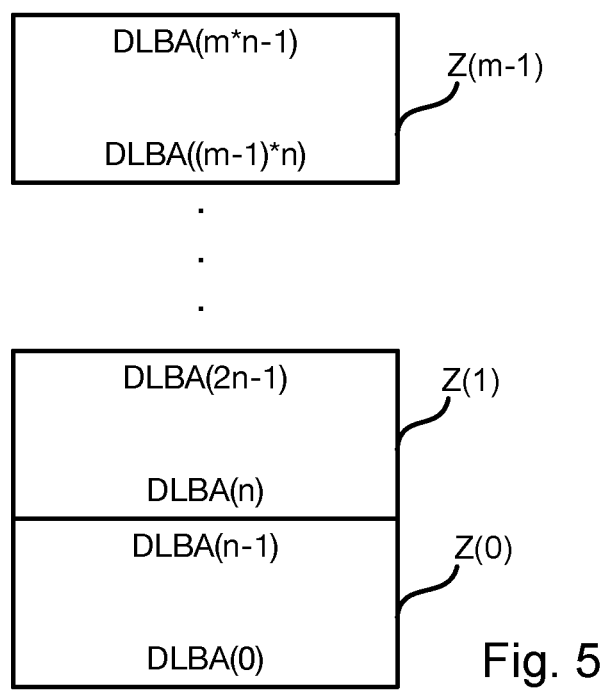
FIG. 5 is schematic block diagram of different zones of device logical block addresses (DLBA) in accordance with an embodiment of the present invention.
Figure 6:
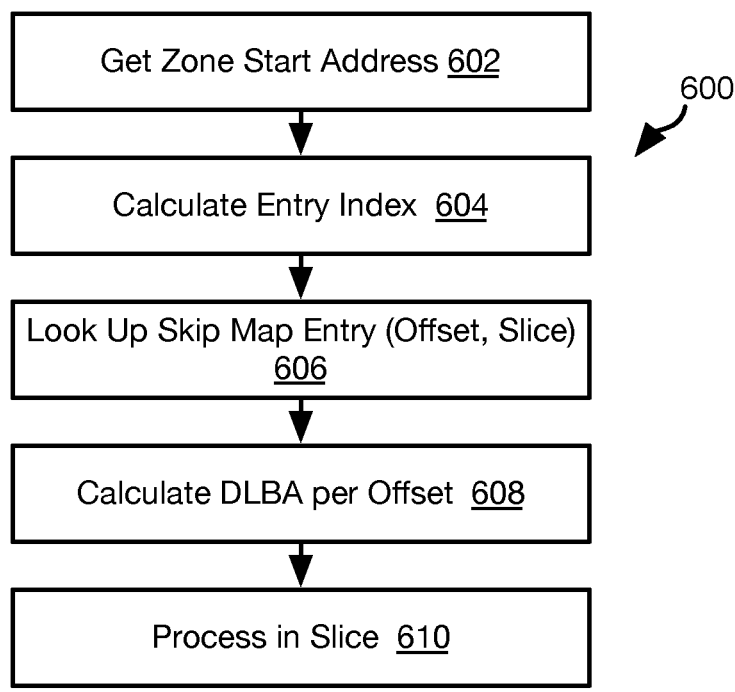
FIG. 6 is a process flow diagram of another method for performing a bit-flipping decoding algorithm in accordance with an embodiment of the present invention.

In the approach of FIGS. 4 through 6, the target volume size would still be 80% of the blocks of the SSD in order to meet the 512 GB volume size. However, the volume size of each slice can be different according to the ratio of defects between slices. The number of mapped DLBAs and the number of skipped DLBA is used to achieve the different volume sizes.

One SSD has several dozens of NAND dies. one NAND die has several thousands of physical blocks. One physical NAND block has several thousands of pages, one page is 8 or 16 kbytes. All together this makes one SSD. Each DLBA may refer to 4K block of data aligned with a FTL (flash translation layer) 4 KB mapping.

In the prior approach, of the number of DLBAs in the example above is 31.25 M (128 GB/4 KB), which will be the number of entries in the DLBA mapping table of the FTL.

Using the approach of FIGS. 4 through 6, the number of DLBAs is 31.25 M*83/80=32.41 M so the DLBA mapping table is bigger. This mapping size is equivalent to the possible mapping size of a NAND that has ideally no defect and therefore has the maximum # of availably: physical blocks. Accordingly, a bigger DLBA table may be required using the approach of FIGS. 4 through 6. However, a skipped DLBA may remain unmapped and therefore won't increase write application nor does it claim more space in the NAND dies.

TABLE 1

DLBA Ratios.

| | Total SSD System | Individual Slice |
|---|---|---|
| Ratio of DLBA | 83% | 83% |
| Ratio of Mapped DLBA | 80% | Variable (Up to 83%) |
| Ratio Skipped DLBA | 3% | Variable (83 - Mapped DLBA %) |

Table 1 illustrates the percentages of DLBAs of an SSD and slice of an SSD that are used to constitute a storage volume. In this illustrated example, the total number of DLBAs defined for the SSD system is 83% of the blocks (e.g. 4 kB blocks) of the NAND dies in the SSD system. The total number DLBAs that are mapped (not skipped) is 80% of blocks of the SSD system. The total number of skipped DLBA is 3% of the blocks of the SSD system.

As shown in Table 1, the number of mapped DLBAs defined for each slice may vary but the total number may be constrained to be less than or equal to a maximum percentage, such as 83%. The number of skipped DLBAs on each slice may likewise vary according to variation in numbers of defects.

The mapped and skipped DLBAs are spread across the slices proportionally according to the ratio of defects of each slice. Some slices can go up to 83% mapped DLBAs and some slice can have mapped DLBAs far below 80% of mapped such that the total mapped DLBAs across all slices is 80%.

In some embodiments, the skipped DLBAs are determined for each slice during manufacturing will not be changed for the entire lifespan of the SSD life span. In some instances, changing would mean that a slice would not be able to maintain its target size.

In this manner, the slice with fewer available blocks will be selected less frequently then the slice with more available blocks and the slice with blocks in excess of the average blocks per slice will be used more and this excess capacity will be utilized. In this manner, fewer NAND dies need be rejected due to defects and those NAND dies with fewer defects may be used to make up for the defects of other NAND dies.

The simple mapping of the prior approach is unable to handle the asymmetric approach described above. Accordingly, a skip map may be used to implement the above-described asymmetric approach. In an alternative approach, a function may be defined and a processor provided in an SSD to execute the function where the function defines the mapping between HLBAs and DLBAs in order to implement skipping.

Where a skip map is used, HLBAs are mapped to slices and DLBAs in a round-robin fashion with certain DLBAs of certain slices being skipped, as shown in FIG. 4. Where an entry in the skip map for a slice and DLBA indicates skipping, that DLBA of that slice will not be mapped to an HLBA. Instead, the next DLBA of the next slice in the round-robin scheme will be mapped to that HLBA. The proportion of skips for each slice may be determined as described above and the skips for each slice may be distributed periodically and possibly uniformly throughout the skip map.

Due to the number of skips in the skip map, the valid count of HLBAs may be less than the capacity of the skip map. In particular, a variable VALID_CNT may specify the number of entries in the skip map, i.e. entries that are not skip entries. In some embodiments, the number of HLBAs mapped by the skip map is equal to the number of DLBAs mapped by the skip map. The total valid count of HLBA and the count of mapped DLBA are a function of the target volume size of the SSD and will be the same for SSDs of the same size. However, each slice may have different valid count as described above.

Referring to FIG. 5, in some embodiments, the skip map does not cover the entire LBA range. For example, a skip map covering the entire LBA range may be too large to be feasible. In such embodiments, the entire range of DLBAs is divided into zones 500*a*-500*c*. For example, as shown in FIG. 5, a particular zone Z(i), i=0 to m−1, corresponds to DLBAs(i*n:(i+1)*n−1), where n is the number of entries in the skip table and m is the number of zones. All zones may share a common skip map to convert HLBAs to DLBAs.

FIG. 6 illustrates a method 600 for converting an HLBA ("the subject HLBA") to a slice index and DLBA corresponding to the subject HLBA ("the mapped DLBA"). The method 600 may be executed by the NAND interface 204, SSD controller 206, host interface 208, a host processor 102, or other device implementing the asymmetric data striping approach described herein.

The method 600 may be understood with respect to the following parameters: DLBA_CNT=Total DLBA count on skip map; and HLBA_CNT=Total HLBA count on skip map. HLBA_CNT may be less than or equal to DLBA_CNT, because skip marks in the slip mark will skip an HBLA to a next DLBA, which causes skip mapping.

The method 600 may include getting 602 a start address of the zone corresponding to the subject HLBA. For example, this may include calculating an index of that zone (ZONE_IDX) as ZONE_IDX=HLBA/HLBA_CNT, where HLBA is the subject HLBA and the division operation is integer division such that fractional results of the division are ignored. The start address of the zone corresponding to ZONE_IDX (DLBA_START_ADDR) may then be calculated as DLBA_START_ADDR=ZONE_IDX*DLBA_CNT.

The method 600 may include calculating 604 an entry index (ENTRY_IDX) that is the index of an entry in the skip map corresponding to the subject HLBA. For example, step 604 may include calculating ENTRY_IDX=HLBA % HLBA_CNT.

The method 600 may then include looking up 606 an entry of the skip map corresponding to ENTRY_IDX. For example, for each ENTRY_IDX, the skip map look up function (SMAP(ENTRY_IDX)) may return an offset (OFFSET) within a slice and an index (SLICE_IDX) for that slice.

The mapped DLBA may then be calculated 608 according to OFFSET and DLBA_START_ADDR, such as mapped DLBA=DLBA_START_ADDR+OFFSET.

The operation referencing the subject HLBA may then be processed 610 in the slice referenced by SLICE_IDX at the mapped DLBA. For example, where the operation is a write operation, data will be written at the mapped DLBA by the slice referenced by SLICE_IDX. Where the operation is a read operation, step 610 may include reading data from the mapped DLBA by the slice referenced by SLICE_IDX.

Note that each operation processed at step 610 may be part of an operation that has been divided into a number of segments corresponding to the number of slices. Accordingly, the method 600 may be preceded by a segmenting step in which the operation is divided into slice operations processed according to the method 600. Each slice operation may then be processed according to the method 600. Where an operation is segmented, the operation may correspond to several HLBAs such that each slice operation references a different HLBA of the several HLBAs and the HLBA of each slice operation is converted to a DLBA as described with respect to the method 600.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A method comprising, by a computing device:
   providing a plurality of storage media, each storage medium of the plurality of storage media having a storage capacity such that the capacities of the plurality of storage media are not all equal;
   processing, by a controller coupled to the plurality of storage media, each operation of a plurality of operations including a host address, the processing including:

dividing, by the controller, the operation into a plurality of slice operations;
distributing the plurality of slice operations among the plurality of storage media according to a mapping function applied to the host address; and
processing the plurality of slice operations by the plurality of storage media according to the distributing;
wherein the mapping function distributes the slice operations among the plurality of storage media unequally;
wherein each storage media of the plurality of storage media has a nominal capacity, the storage capacity being the nominal capacity less a number of defects in the each storage medium;
wherein the nominal capacities of the plurality of storage media are equal;
wherein the mapping function distributes the slice operations among the plurality of storage media unequally by distributing the slice operations to the plurality of storage media in a round robin fashion with occasional skipping of one or more storage media of the plurality of storage media.

2. The method of claim 1, wherein the mapping function defines a mapping table mapping host logical block addresses (HLBA) to device logical block addresses (DLBA) of the plurality of storage media, the HLBA being assigned to DLBA of the plurality of storage media in the mapping table in a round robin fashion with occasional skipping of each storage medium the plurality of storage media, a probability of skipping of the each storage medium being a function of a number of defects in the each storage medium.

3. The method of claim 1, wherein each storage media of the plurality of storage media has a slice index, the mapping function selecting a device address and slice index according to the host address for each slice operation of the plurality of slice operations such that a probability of selection of a slice index decreases with increase in the number of defects in the each storage medium corresponding to the slice index.

4. The method of claim 3, further comprising:
determining a zone offset corresponding to the host address, the zone address corresponding to a block of host addresses;
determining a skip offset according to the mapping function; and
determining the device address as a sum of the zone offset and the skip offset.

5. The method of claim 1, wherein the plurality of storage media are a plurality of NAND flash storage devices.

6. An apparatus comprising:
a plurality of storage media, each storage medium of the plurality of storage media having a storage capacity such that the capacities of the plurality of storage media are not all equal;
a controller coupled to the plurality of storage media, the controller being programmed to:
receive a plurality of operations, each operation of the plurality of operations including a host address;
for each operation of the plurality of operations:
divide the operation into a plurality of slice operations;
distribute the plurality of slice operations among the plurality of storage media according to a mapping function applied to the host address such that a distribution of the slice operations among the plurality of storage media is unequal; and
processing the plurality of slice operations by the plurality of storage media according to the distribution;
wherein each storage media of the plurality of storage media has a nominal capacity, the storage capacity being the nominal capacity less a number of defects in the each storage medium; and
wherein the nominal capacities of the plurality of storage media are equal;
wherein the controller is programmed to distribute the plurality of slice operations among the plurality of storage media according to the mapping function by distributing the slice operations to the plurality of storage media in a round robin fashion with occasional skipping of one or more storage media of the plurality of storage media.

7. The apparatus of claim 6, wherein the mapping function defines a mapping table mapping host logical block addresses (HLBA) to device logical block addresses (DLBA) of the plurality of storage media, the HLBA being assigned to DLBA of the plurality of storage media in the mapping table in a round robin fashion with occasional skipping of each storage medium of the plurality of storage media, a probability of skipping of the each storage medium being a function of a number of defects in the each storage medium.

8. The apparatus of claim 6, wherein each storage medium of the plurality of storage media has a slice index, the controller being programmed to select a device address and slice index according to the host address for each slice operation of the plurality of slice operations such that a probability of selection of a slice index decreases with increase in the number of defects in the each storage medium corresponding to the slice index.

9. The apparatus of claim 8, wherein the controller is further programmed to:
determine a zone offset corresponding to the host address, the zone offset corresponding to a block of host addresses;
determine a skip offset according to the mapping function based on the host address; and
determine the device address as a sum of the zone offset and the skip offset.

10. The apparatus of claim 7, wherein the plurality of storage media are a plurality of NAND flash storage devices.

11. The apparatus of claim 10, wherein the controller is a solid state drive (SSD) controller in a SSD including the plurality of NAND flash storage devices.

12. The apparatus of claim 10, wherein the controller is a host processor coupled to a solid state drive (SSD) including the plurality of NAND flash storage devices.

13. An apparatus comprising:
a plurality of NAND storage devices, the plurality of NAND storage devices having equal nominal storage capacities and having unequal number of defects such that the plurality of NAND storage devices do not all have equal available storage capacities;
a controller coupled to the plurality of NAND storage devices, the controller being programmed to:
receive a plurality of operations, each operation of the plurality of operations including a host address;
for each operation of the plurality of operations:
divide the operation into a plurality of slice operations;
distribute the plurality of slice operations among the plurality of NAND storage devices according to round robin approach with occasional skipping of one or more NAND storage devices of the plurality of NAND storage devices, a probability of skipping each NAND storage device of the one or more NAND storage devices corresponding to the number of defects of the each NAND storage device;

processing the plurality of slice operations by the plurality of NAND storage devices according to the distribution;

wherein each NAND storage device of the plurality of NAND storage devices has a slice index, the controller being programmed to select a device address and slice index according to the host address for each slice operation of the plurality of slice operations according to a mapping table, the mapping table mapping host addresses to device addresses of the plurality of NAND storage devices, the host addresses being assigned to device addresses of the plurality of NAND storage devices in the mapping table in a round robin fashion with occasional skipping of each NAND storage device of the plurality of NAND storage devices, a probability of skipping of each NAND storage device being a function of a number of defects in the each NAND storage device.

14. The apparatus of claim 13, wherein the controller is a solid state drive (SSD) controller in a SSD including the plurality of NAND storage devices.

15. The apparatus of claim 13, wherein the controller is a host processor coupled to a solid state drive (SSD) including the plurality of NAND storage devices.

* * * * *